(12) United States Patent
Wu

(10) Patent No.: US 8,976,266 B2
(45) Date of Patent: Mar. 10, 2015

(54) PICTURE LOCATING METHOD AND SYSTEM BASED ON NAVIGATION FUNCTION OF MOBILE TERMINAL

(71) Applicant: Tencent Technology (Shenzhen) Company Limited, Guangdong (CN)

(72) Inventor: Yongjian Wu, Guangdong (CN)

(73) Assignee: Tencent Technology (Shenzhen) Company Limited, Futian District Shenzhen, Guangdong (CN)

( * ) Notice: Subject to any disclaimer, the term of this patent is extended or adjusted under 35 U.S.C. 154(b) by 0 days.

(21) Appl. No.: 14/351,117

(22) PCT Filed: Dec. 5, 2012

(86) PCT No.: PCT/CN2012/085916
§ 371 (c)(1),
(2) Date: Apr. 10, 2014

(87) PCT Pub. No.: WO2013/083038
PCT Pub. Date: Jun. 13, 2013

(65) Prior Publication Data
US 2014/0300776 A1  Oct. 9, 2014

(30) Foreign Application Priority Data

Dec. 8, 2011  (CN) .......................... 2011 1 0405657

(51) Int. Cl.
*H04N 5/76* (2006.01)
*H04N 5/91* (2006.01)
(Continued)

(52) U.S. Cl.
CPC ............. *H04N 5/91* (2013.01); *H04M 1/72572* (2013.01); *G06F 17/3087* (2013.01);
(Continued)

(58) Field of Classification Search
CPC ............... H04N 5/91; H04M 1/72572; H04M 2250/52; H04W 4/02; H04W 4/185; G01S 19/51; G01S 5/16; G06F 17/3087
USPC ........ 348/207.99, 231.99–231.9; 340/539.13; 386/227
See application file for complete search history.

(56) References Cited

U.S. PATENT DOCUMENTS

2008/0117309 A1* 5/2008 Jeon ........................... 348/231.2
(Continued)

FOREIGN PATENT DOCUMENTS

CN   101184135 A   5/2008
(Continued)

OTHER PUBLICATIONS

International Search Report for PCT/CN2012/085916 mailed on Mar. 14, 2013 in 2 pages.
(Continued)

*Primary Examiner* — Dennis Hogue
(74) *Attorney, Agent, or Firm* — Knobbe, Martens, Olson & Bear LLP

(57) ABSTRACT

Examples of the present disclosure provide a method and system for locating a picture, based on navigation functions of a mobile terminal. The method includes the follows. During a process of utilizing a photographic device to take a picture, current time information and geographical location information of current track point may be obtained and recorded by a mobile terminal, by using navigation functions carried by the mobile terminal. Picture shooting time carried by the picture taken and the time information obtained by the mobile terminal may be associated with each other, such that geographical location information where the picture is taken may be determined. Time of the photographic device is synchronous with time of the mobile terminal.

10 Claims, 10 Drawing Sheets

(51) Int. Cl.
*H04M 1/725* (2006.01)
*G06F 17/30* (2006.01)
*G01S 19/51* (2010.01)
*G01S 5/16* (2006.01)
*H04W 4/02* (2009.01)
*H04W 4/18* (2009.01)

(52) U.S. Cl.
CPC . *G01S19/51* (2013.01); *G01S 5/16* (2013.01); *H04W 4/02* (2013.01); *H04M 2250/52* (2013.01); *H04W 4/185* (2013.01)
USPC ............. 348/231.5; 386/227; 340/539.13

(56) References Cited

U.S. PATENT DOCUMENTS

2009/0135274 A1* 5/2009 Kim et al. ............... 348/231.5
2010/0214443 A1* 8/2010 Wang et al. ............. 348/231.3
2010/0220213 A1* 9/2010 Ueno et al. .............. 348/231.3

FOREIGN PATENT DOCUMENTS

| CN | 101272456 A | 9/2008 |
|---|---|---|
| CN | 201517925 U | 6/2010 |
| WO | WO 2005048584 | 5/2005 |

OTHER PUBLICATIONS

Written Opinion of the International Search Authority for PCT/CN2012/085916 mailed Mar. 14, 2013 in pages (English Translation in 11 pages).

* cited by examiner

PICTURE LOCATING METHOD AND SYSTEM BASED ON NAVIGATION FUNCTION OF MOBILE TERMINAL

This application claims priority to a Chinese patent application No. 201110405657.2, titled "picture location method and system based on navigation functions of mobile terminal", which was filed on Dec. 8, 2011. The disclosures of the application No. 201110405657.2 are incorporated here by reference.

TECHNICAL FIELD

The present disclosure relates to mobile communication technologies, and more particularly, to a picture locating method and system based on navigation functions of mobile terminal.

BACKGROUND

In mobile communication technologies, GPS is the abbreviation for "Global Positioning System". GPS is a new generation of space satellite navigation and positioning system, which was developed by army, navy and air force of the United States in the 1970s. The main objective of the GPS is to provide real-time, round-the-clock and global navigation services for three areas of army, navy and air force, and is to implement some military purposes, such as collect intelligence, monitor nuclear explosions, and emergence communication. After 20 years of researches and experiments, GPS technologies have developed rapidly. Compared with many other wireless location technologies, the GPS technologies have the following advantages, such as wide coverage, high location accuracy, short location time and small location dependency. The GPS technologies are originally used in military. Based on the foregoing advantages, the GPS technologies have been popularized in daily life, such as GPS smart phone, and vehicle-carried GPS.

Although the GPS technologies have been popularized in daily life, photographic device with GPS navigation functions still cannot be popularly used, due to the fact that price of the photographic device with the GPS navigation functions is much higher than that of ordinary photographic device. However, a picture taken by an ordinary photographic device may not carry geographical location information, which may restrict subsequent management of picture with the help of geographical location information of the picture.

Thus, a method to determine geographical location information, where a picture is taken by an ordinary photographic device, is a technical problem to be solved.

SUMMARY

Examples of the present disclosure provide a method and system for locating pictures, based on navigation functions of mobile terminal, such that geographical location information where a picture is taken by an ordinary photographic device without navigation functions may be determined.

Technical solutions of the present disclosure may include the follows.

A method for locating a picture based on navigation functions of a mobile terminal, which includes:
during a process of taking the picture by utilizing a photographic device, obtaining and recording, by the mobile terminal, current time information and geographical location information of current track point, by using the navigation functions carried by the mobile terminal;
associating a picture shooting time carried by the picture taken and the time information obtained by the mobile terminal, such that geographical location information where the picture is taken is determined, wherein time of the photographic device is synchronous with time of the mobile terminal;
wherein when obtaining and recording by the mobile terminal current time information and the geographical location information of current track point, by using the navigation functions carried by the mobile terminal, obtaining and recording by the mobile terminal current time information and the geographical location information of current track point include:
after waiting for a time period Δt, obtaining, by the mobile terminal, current time information and the geographical location information of current track point, by using the navigation functions carried by the mobile terminal;
when the mobile terminal has successfully obtained current time information and the geographical location information of current track point, recording, by the mobile terminal, the obtained current time information and the geographical location information of current track point, when the obtaining is a first obtaining, or the obtaining is not the first obtaining, however, a previous obtaining is successful, executing the block of the mobile terminal waiting for the time period Δt; otherwise, updating the Δt, based on a principle of reducing resource consumption of the mobile terminal, after waiting for updated Δt, executing the block of the mobile terminal obtaining current time information and the geographical location information of current track point, by using the navigation functions carried by the mobile terminal;
when the mobile terminal does not successfully obtain current time information and the geographical location information of current track point, updating number of times about failed statistics, and determining whether updated number of times about failed statistics is less than or equal to a set threshold, if yes, updating Δt based on the principle of reducing the resource consumption of the mobile terminal, after waiting for the updated Δt, executing the block of the mobile terminal obtaining current time information and the geographical location information of current track point, by using the navigation functions carried by the mobile terminal; otherwise, executing the block of the mobile terminal waiting for the time period Δt.

A system for locating a picture based on navigation functions of a mobile terminal, wherein the system includes the mobile terminal with the navigation functions and a query server, time of a photographical device is synchronous with time of the mobile terminal, and the mobile terminal includes an obtaining unit and a recording unit;
the obtaining unit is configured to obtain current time information and geographical location information of current track point, by using the navigation functions carried by the mobile terminal, during a process of taking the picture with the photographic device;
the recording unit is configured to record the information obtained by the obtaining unit;
wherein the query server includes a location determining unit, which is configured to associate a picture shooting time carried by the picture taken with the time information obtained by the mobile terminal, and determining geographical location information where the picture is taken;
wherein the obtaining unit includes an obtaining subunit, a determining subunit, a first updating subunit and a second updating subunit,
the obtaining subunit is configured to execute operations of obtaining current time information and the geographical location information of current track point, by using the navigation functions carried by the mobile terminal, after waiting for a time period Δt;

the determining subunit is configured to determine whether the obtaining subunit has successfully obtained current time information and the geographical location information of current track point;

when determining that the obtaining subunit has not successfully obtained current time information and the geographical location information of current track point, the determining subunit is further configured to inform the second updating subunit;

when determining that the obtaining subunit has successfully obtained current time information and the geographical location information of current track point, the determining subunit is further configured to trigger the recording unit to record the information successfully obtained by the obtaining subunit, and when determining that the obtaining is a first obtaining, or determining that the obtaining is not the first obtaining, a previous obtaining is successful, return to the operations executed by the obtaining subunit, otherwise, the determining subunit is further configured to transmit a notification to the first updating subunit;

when receiving the notification from the determining subunit, the first updating subunit is configured to update Δt, based on a principle of reducing resource consumption of the mobile terminal, and trigger the obtaining subunit to execute the operations of obtaining current time information and the geographical location information of current track point, after waiting for updated Δt; and after receiving a notification from the determining subunit, the second updating subunit is further configured to update number of times about failed statistics, and determine whether the updated number of times about failed statistics is less than or equal to a set threshold;

when determining that the updated number of times about failed statistics is less than or equal to the set threshold, the second updating subunit is further configured to update Δt, based on the principle of reducing the resource consumption of the mobile terminal, and trigger the obtaining subunit to execute the operations of obtaining current time information and the geographical location information of current track point, after waiting for the updated Δt, otherwise, return to the operations executed by the obtaining subunit.

Based on the foregoing technical solutions, it can be seen that, in the present disclosure, during the process of utilizing a photographic device to take a picture, a mobile terminal may obtain and record current time information, and geographical location information of current track point, by using the navigation functions. And then, picture shooting time carried by the picture taken may be associated with time information obtained by the mobile terminal, such that the geographical location information where the picture is taken may be determined. That is, in the present disclosure, the picture shooting time carried by the picture and the time information recorded by the mobile terminal may be taken as a bridge of communication between the photographic device and the mobile terminal, which may cleverly associate the navigation functions of the mobile terminal device with the picture, and enable the picture to carry the geographical location information without increasing costs.

BRIEF DESCRIPTIONS OF THE DRAWINGS

DETAILED DESCRIPTIONS

To make objectives, technical solutions and advantages of the present disclosure more clear, detailed descriptions about the present disclosure will be described in the following accompanying with attached figures and specific examples.

By employing the method of the present disclosure, a picture taken by an ordinary photographic device without navigation functions, such as an ordinary photographic device without GPS navigation functions, may carry geographical location information. The method provided by the present disclosure will be described in the following.

Figure 1:
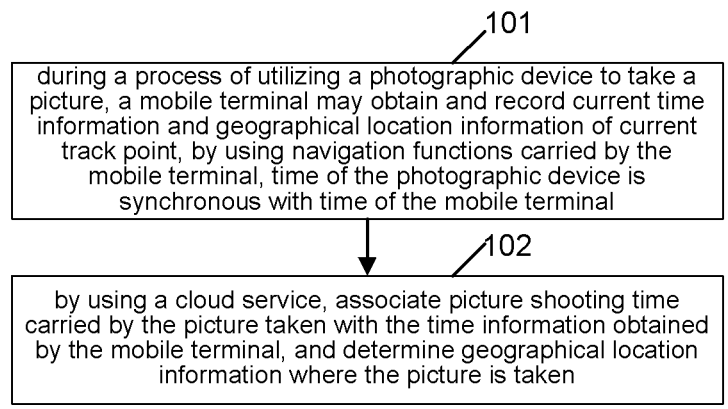
FIG. 1 is a flowchart illustrating a method, in accordance with an example of the present disclosure.

With reference to FIG. 1, FIG. 1 is a flowchart illustrating a method, in accordance with an example of the present disclosure. As shown in FIG. 1, the method may include the following blocks.

In block 101, during the process of utilizing a photographic device to take a picture, a mobile terminal may obtain and record current time information, as well as geographical location information of current track point, by using navigation functions carried by the mobile terminal. Time of the photographic device is synchronous with that of the mobile terminal.

The photographic device in block 101 may be foregoing ordinary photographic device without navigation functions. In addition, to facilitate descriptions, the following descriptions are provided by taking an example, in which the navigation functions refer to the GPS navigation functions. For other situations, the principle is similar.

In block 102, associate picture shooting time carried by the taken picture with time information obtained by the mobile terminal, such that geographical location information of the taken picture may be determined. This block may be implemented, but not limited to, cloud services.

That is, in the present disclosure, the picture shooting time carried by the picture and the time information recorded by the mobile terminal may be taken as a bridge of communication between the photographic device and the mobile terminal, which may cleverly associate the GPS navigation functions of the mobile terminal device with the picture, and enable the picture to carry the geographical location information without increasing costs.

Until now, the flow illustrated with FIG. 1 has been finished.

To make the flow illustrated with FIG. 1 more clear, the flow illustrated with FIG. 1 may be described in the following, accompanying with specific examples.

Figure 2:
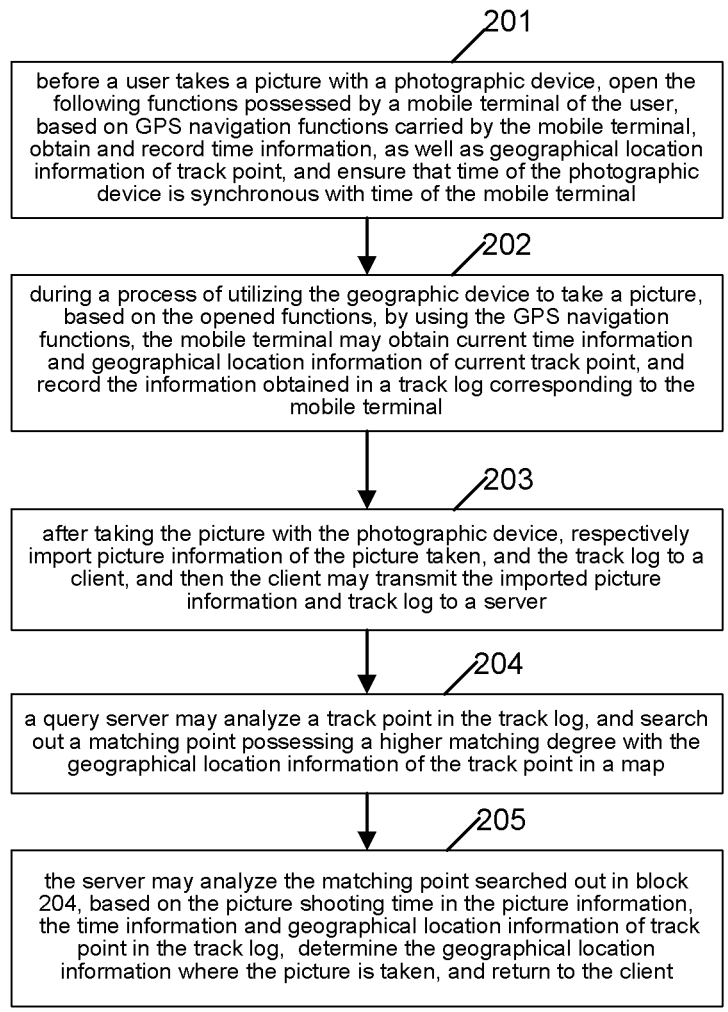
FIG. 2 is a flowchart illustrating a method, in accordance with another example of the present disclosure.

With reference to FIG. 2, FIG. 2 is a flowchart illustrating a method, in accordance with another example of the present disclosure. As shown in FIG. 2, the method may include the following blocks.

In block 201, before a user utilizes a photographic device to take a picture, open the following functions possessed by a mobile terminal of the user. Based on the GPS navigation functions carried by the mobile terminal, obtain and record time information, as well as geographical location information of a track point, and ensure that time of the photographic device is synchronous with that of the mobile terminal.

In block 202, during the process of utilizing the photographic device to take the picture, based on the foregoing opened functions, the mobile terminal may obtain current time information and geographical location information of current track point, by using the GPS navigation functions, and record the obtained information in a track log corresponding to the mobile terminal.

Figure 3:
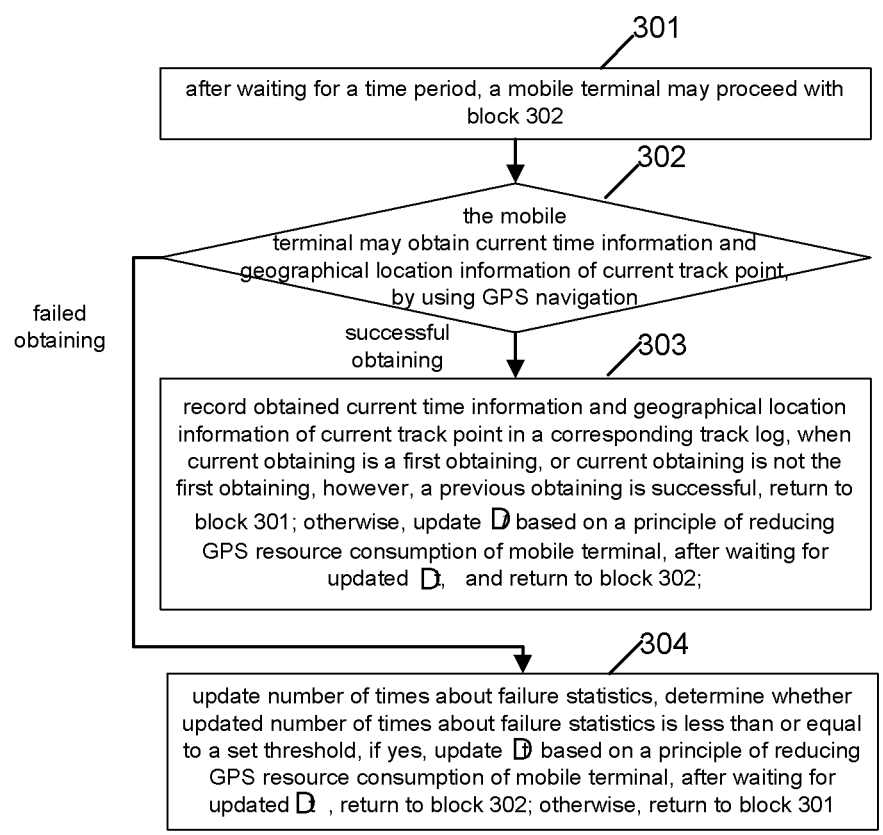
FIG. 3 is a flowchart illustrating how to implement block 101 or 202, in accordance with an example of the present disclosure.

In block 202, the mobile terminal may periodically obtain current time information and geographical location information of current track point, by using the GPS navigation functions, which may refer to the flow illustrated with FIG. 3. The geographical location information of the track point may be longitude and latitude of the track point, which is not limited in the present disclosure.

In Table 1, format of the track log is shown with an example, in which the geographical location information of the track point is the longitude and latitude of the track point.

|  | latitude | longitude | time information |
|---|---|---|---|
| p(g) | lat_g | long_g | time_g |
| p(e) | lat_e | long_e | time_e |
| ...... | | | |
| p(a) | lat_a | long_a | time_a |

In table 1, p( ) denotes a track point. For example, p(g) denotes track point g.

In block 203, after taking the picture by utilizing the photographic device, respectively import picture information of the taken picture, and the track log to a client. And then, the client may transmit the imported picture information and track log to a server.

The server in block 203 may be a server used for determining the geographical location information of the picture, which may be recorded as a query server. The following descriptions are provided by taking the query server as an example.

In addition, in block 203, the imported picture information may be the identity (ID) of the picture, the shooting time carried by the picture, which is not limited by the present disclosure.

In block 204, the query server may analyze the track point in the track log, and search out a matching point possessing a higher matching degree with the geographical location information of the track point in a map.

The objective of block 204 is to correct the geographical location information of the track point in the track log, so as to restore the real track trajectory of the user.

In block 205, based on picture shooting time in the picture information, the time information in the track log and the geographical location information of the track point, the server may analyze the matching point searched out in block 204, determine the geographical location information where the picture is taken, and return to a client.

Foregoing blocks 203 to 205 are the specific flowchart for implementing foregoing block 102.

Until now, the flow illustrated with FIG. 2 may be completed.

Based on the flows illustrated with FIG. 1 and FIG. 2, it can be seen that, to implement the present disclosure, it is necessary to have the aid of the GPS navigation functions carried by the mobile terminal. However, for a mobile terminal, when the GPS navigation functions are employed for a long term, resource consumption of the mobile terminal may be larger. Subsequently, the scenario that the mobile terminal has no power may easily occur, which may affect implementation of other functions of the mobile terminal. Based on the foregoing problem, creative work is executed in the present disclosure. The present disclosure puts forward that, obtain and record time information and geographical location information of track point, by using the GPS navigation functions, on the precondition of reducing GPS resource consumption of mobile terminal.

With reference to FIG. 3, FIG. 3 is a flowchart illustrating how to implement block 101 or block 202, in accordance with an example of the present disclosure. Take into consideration that the reason of larger GPS resource consumption is to search for and locate by a satellite, the flow may minimize the usage of GPS, so as to effectively reduce the larger resource consumption. As shown in FIG. 3, the flow may include the following blocks.

In block 301, after waiting for a time period $\Delta t$ by a mobile terminal, proceed with block 302.

In block 302, the mobile terminal may obtain current time information and geographical location information of current track point, by using GPS navigation functions. When the mobile terminal has successfully obtained current time information and geographical location information of current track point, proceed with block 303. When the mobile terminal doesn't successfully obtain current time information and geographical location information of current track point, proceed with block 304.

When the mobile terminal firstly obtains time information and geographical location information of track point, $\Delta t$ (unit of which may be a minute) in block 301 may be a set default time period $T_{start} \cdot T_{start}$ may be determined by two aspects of resource consumption and information accuracy.

In addition, in the present disclosure, data range of the time period $\Delta t$ for the mobile terminal to obtain time information and geographical location information of track point is roughly $2 \leq \Delta t \leq 5$. In addition to taking into consideration the resource consumption and information accuracy, value of $\Delta t$ may be further determined based on resource consumption information of hardware of the mobile terminal, such as Central Processing Unit (CPU) frequency.

In block 303, record the obtained current time information and geographical location information of current track point in a corresponding track log. When the obtaining is the first obtaining, or when the obtaining is not the first obtaining, however previous obtaining is successful, return back to block 301; otherwise, update $\Delta t$, based on a principle of reducing GPS resource consumption of the mobile terminal, and return to block 302, after waiting for the updated $\Delta t$.

In block 303, updating Δt based on the principle of reducing the GPS resource consumption of the mobile terminal may include the follows.

Determine whether Δt is less than a set default time period. When determining that Δt is less than the set default time period, update Δt to be the set default time period; otherwise, shorten Δt to be a first set value, such as shorten half. The following codes are provided to describe how to update Δt, based on the principle of reducing GPS resource consumption of the mobile terminal, when Δt is shorted half.

if Δt<$T_{start}$, Δt=$T_{start}$;
    else Δt=Δt/2.

In block 304, update number of times about failed statistics, and determine whether the updated number of times about failed statistics is less than or equal to a set threshold. When determining that the updated number of times about failed statistics is less than or equal to the set threshold, update Δt based on the principle of reducing GPS resource consumption of the mobile terminal, and return back to block 302, after waiting for the updated Δt; otherwise, return back to block 301.

In block 304, update the number of times about failed statistics may be implemented with the following code: ++count$_{fail}$.

In block 304, update Δt based on the principle of reducing the GPS resource consumption of the mobile terminal may include the follows.

Determine whether Δt is greater than or equal to a set maximum time period $T_{max}$. When determining that Δt is greater than or equal to the set maximum time period $T_{max}$, update Δt to be the maximum time period $T_{max}$; otherwise, expand Δt to be a second set value, such as double expanding. Codes describing how to update Δt based on the principle of reducing the GPS resource consumption of the mobile terminal are provided in the following with an example, in which a twofold expanding is performed on Δt.

if Δt≥$T_{max}$, Δt=$T_{max}$;
    else Δt=Δt*2.

Until now, the flow illustrated with FIG. 3 may be completed.

The objective of the flow illustrated with FIG. 3 is to minimize usage of GPS, so as to reduce resource consumption of mobile terminal. In foregoing block 304, when GPS doesn't successfully obtain time information and geographical location information (which may be referred to as GPS information for short) of track point, it may guess that the user has entered the room, who may execute indoor activities for a long time (such as shopping, making friends and taking food). Thus, it is necessary to expand time period Δt. However, Δt may be not expanded unlimited. That is, Δt may not exceed $T_{max}$, which may avoid the following scenario. That is, after transferring from a place, where no GPS information may be obtained, to another place, where the GPS information may be obtained, a user may execute the obtaining of GPS information of next round after waiting for a longer time. On the contrary, after a user obtains the GPS information, Δt may be shortened, such as shorten half. It should be noted that, Δt may be not immediately reduced to $T_{start}$, due to the fact that sudden changes in the environment may be resulted from accidental phenomena (for example, suddenly go to the window in the room where GPS signal is better).

Figure 4:
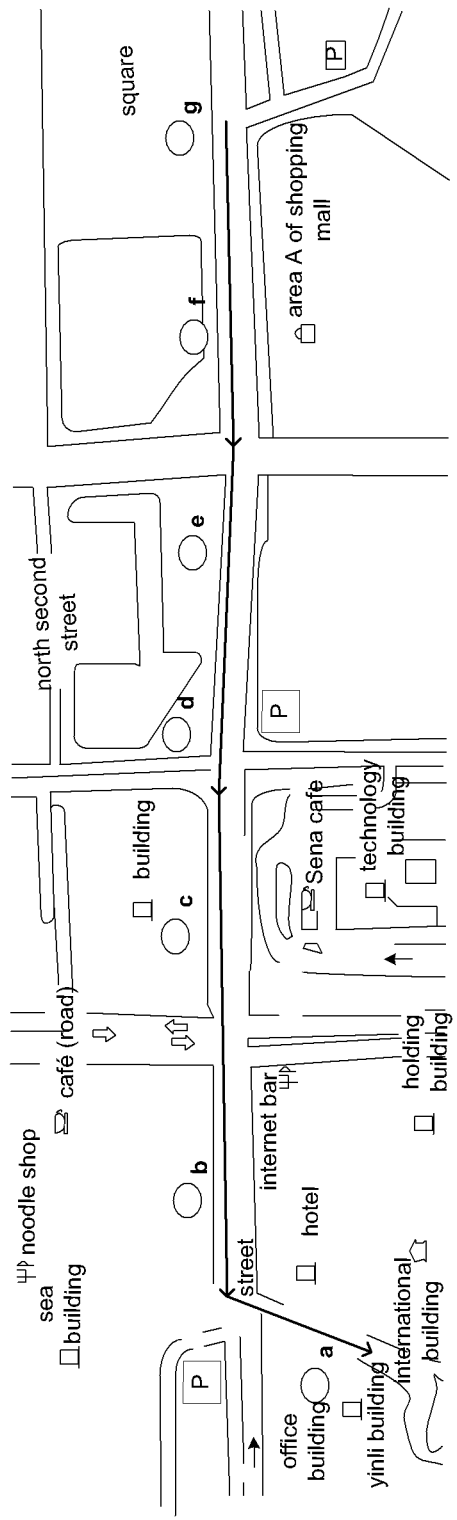
FIG. 4 is a schematic diagram illustrating GPS navigation accuracy, in accordance with an example of the present disclosure.

Based on the flow illustrated with FIG. 3, the larger resource consumption of mobile terminal may be reduced. However, current GPS navigation accuracy is relatively high, which may still have an accuracy error from several meters to dozens of meters. For example, as shown in FIG. 4, the bold line in FIG. 4 demonstrates the real track trajectory of the user, while, a, b, c, d, e, f, g in FIG. 4 are current track points, which are obtained and recorded by the mobile terminal by using the GPS navigation functions. It is obvious that an accuracy error exists between the bold line and current track points, which are demonstrated by a, b, c, d, e, f, g in FIG. 4. Subsequently, the determined geographical location information where the picture is taken may be influenced by the GPS accuracy error. Thus, it is necessary for the query server in foregoing block 204 to analyze track points in the track log, and search out a matching point possessing a higher matching degree with the geographical location information of each track point in the map.

To implement block 204, the following three factors need to be considered.

The first factor is as follows. The GPS navigation possesses an accuracy error from several meters to dozens of meters.

The second factor is as follows. Based on the flow illustrated with FIG. 3, it can be seen that the mobile terminal may obtain and record GPS information once at set intervals of Δt. Thus, the GPS information of the track log corresponding to the mobile terminal may be sparse, which is unfavorable for data statistics.

The third factor is as follows. Some track points are not easy to be located. For example, point d in FIG. 4 may be mapped to an east-west street, or a north-south street.

Regarding foregoing three factors, the present disclosure provides a track log map matching algorithm to implement foregoing block 204. Before describe the track log map matching algorithm in detail, a brief description about the core idea of the track log map matching algorithm is firstly provided.

The first point is as follows. Location information of track points in the track log may have an influence on each other. For example, whether point d in FIG. 4 is mapped to the east-west street or the north-south street is dependent on geographical location information of point d, as well as mapping situations of adjacent points e, f, c, b of point d. Since points e, f, c and b are mapped to the east-west street, the probability of point d being mapped to the east-west street may be higher than that of point d being mapped to the north-south street.

The second point is as follows. Adjacent track points may have an influence on each other. Around points of point d in FIG. 4, such as point e, may have an influence on consideration of point d. Similarly, point d may also have an influence on consideration of point e.

Detailed descriptions about the track log map matching algorithm will be provided in the following.

Figure 5:
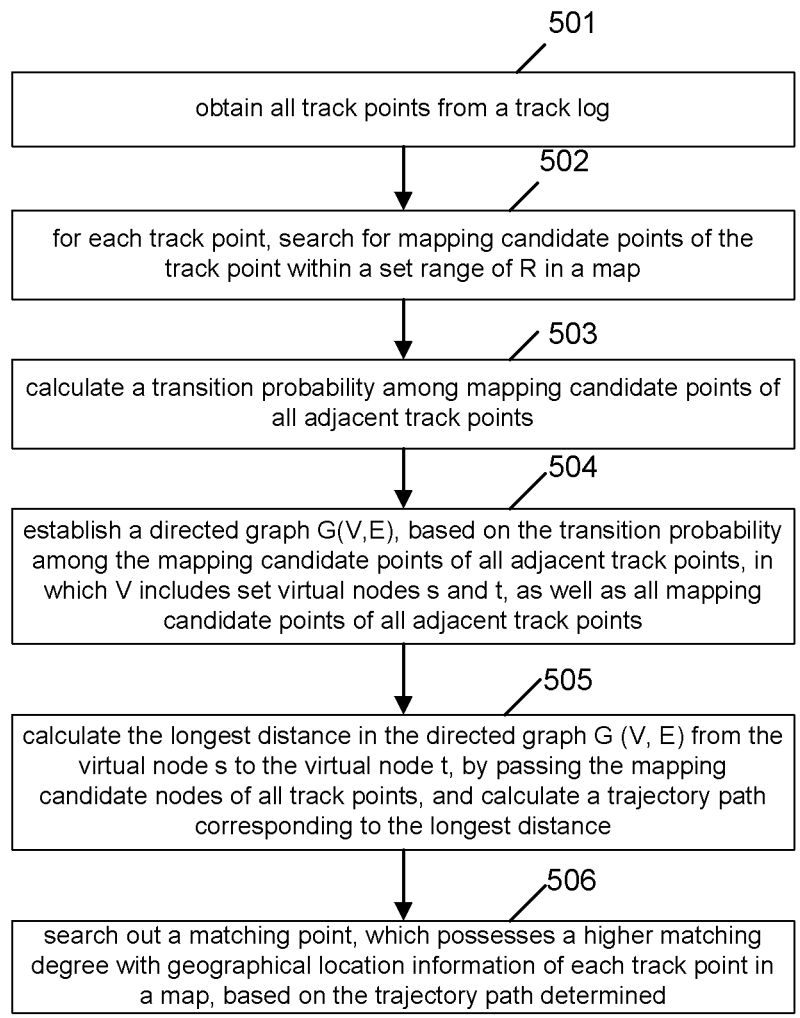
FIG. 5 is a flowchart illustrating how to implement block 204, in accordance with an example of the present disclosure.

With reference to FIG. 5, FIG. 5 is a flowchart illustrating how to implement block 204, in accordance with an example of the present disclosure. As shown in FIG. 5, the flow may also include the following blocks.

In block 501, obtain all track points from a track log.

In block 502, regarding each track point, search for mapping candidate points of the track point within a set range of R in a map.

The definition about mapping candidate points (referred to as candidate point for short) of track point refer to cross points of vertical points of all paths and paths, which are within the range of R of the track point.

Figure 6:
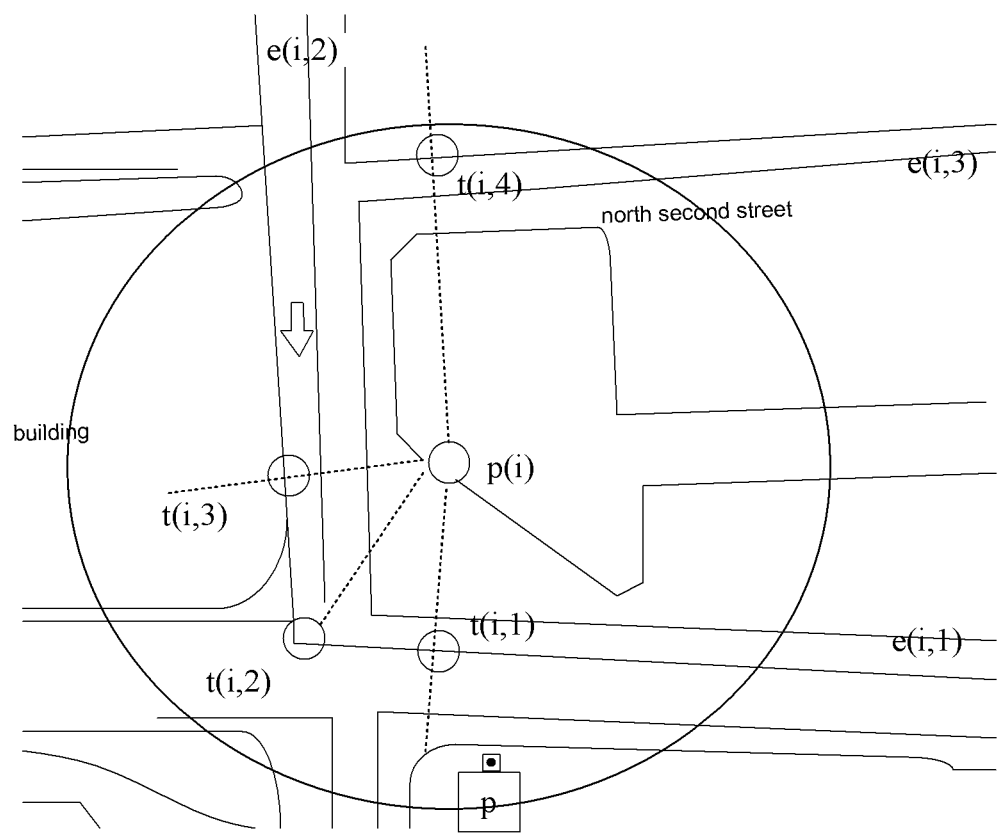
FIG. 6 is a schematic diagram illustrating mapping candidate points, in accordance with an example of the present disclosure.

For example, when the total number of track points obtained in block 501 is n. The $i^{th}$ track point may be defined as p(i), the time information of which is timestamp(i). And then, as shown in FIG. 6, a mapping candidate point set of track point p(i) is {t(i,1),t(i,2),t(i,3),t(i,4)}. t(i,1),t(i,3),t(i,4)

are vertical points to paths of track point p(i) within the range of R. t(i,2) is a cross point between an east-west street and a south-north street.

In block 503, calculate a transition probability among mapping candidate points of all adjacent track points.

Block 503 may be implemented with the following formulae.

$$P(t(i, g), t(j, k)) = \frac{dist(p(i), p(j))}{dist_{shortest}(t(i, g), t(j, k))} \text{ if } i \neq j;$$

$$P(t(i, g), t(j, k)) = 0, \text{ if } i = j;$$

p(i) and p(j) denote two adjacent track points. t(i,g) denotes a mapping candidate point of track point p(i). t(j,k) denotes a mapping candidate point of track point p(j). P(t(i,g),t(j,k)) denotes a transition probability between the mapping candidate point t(i,g) of track point p(i) and the mapping candidate point t(j,k) of track point p(j). dist(p(i),p(j)) denotes the Euclidean distance between the two adjacent track points p(i) and p(j). $dis_{shortest}$ (t(i,g),t(j,k)) denotes the shortest distance between t(i,g) and t(j,k) in the map.

When calculating the transition probability among mapping candidate points of two adjacent track points, as an example of the present disclosure, only the Euclidean distance between the two track points, and the shortest distance between two mapping candidate points in the map may be considered. Preferably, other factors may also be considered by the present disclosure, such as speed limits on the road.

Figure 7:
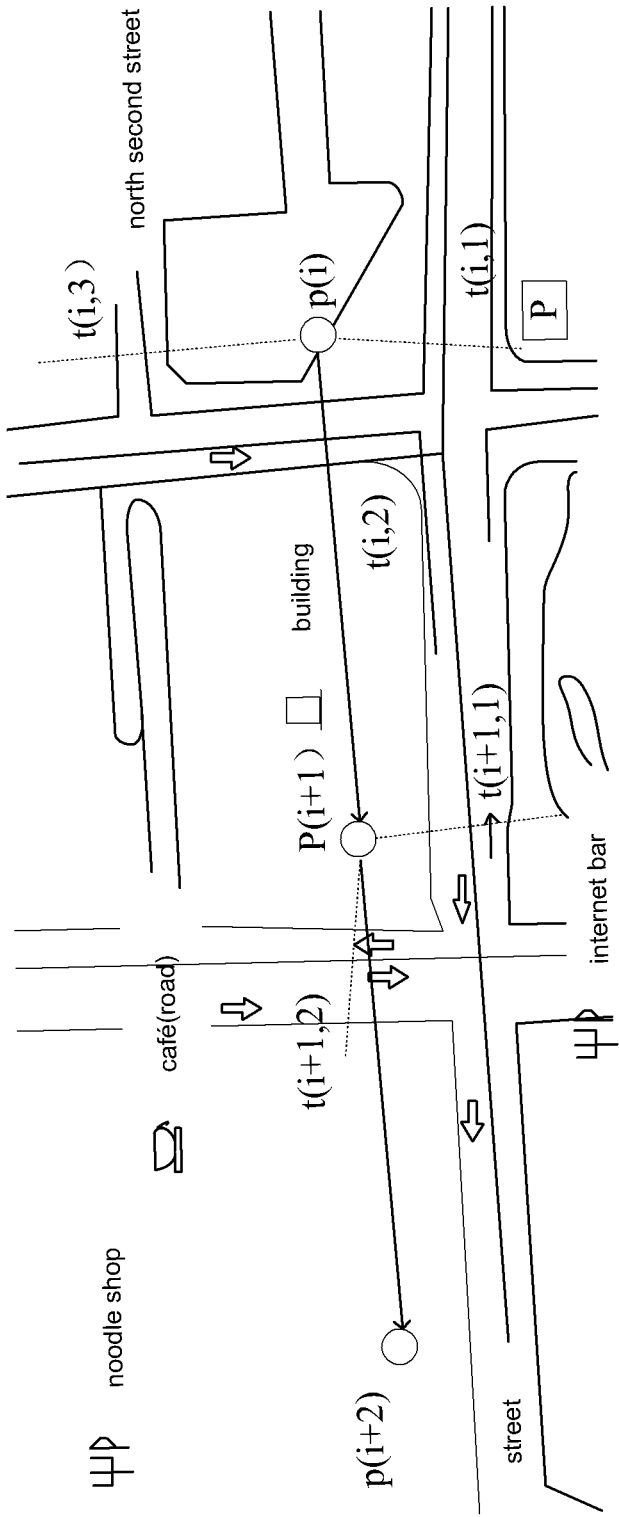
FIG. 7 is a schematic diagram illustrating a transition probability between mapping candidate points, in accordance with an example of the present disclosure.

It should be noted that, in block 503, the transition probability between two mapping candidate points refers to a probability of a user actually executes track transferring from these two mapping candidate points. For example, as shown in FIG. 7, the probability of transferring from the mapping candidate point t(i,1) of p(i) to the candidate point t(i+1,1) of p(i+1) is much higher than the following probability, which is about transferring from the mapping candidate point t(i,2) of p(i) to the candidate point t(i+1,2) of p(i+1). Besides, from a global point of view, it can be seen that the next track point of p(i+1) is p(i+2). Thus, it may be learned that the track of the user is to walk along the east-west direction.

In block 504, establish a directed graph G (V, E), based on the transition probability among mapping candidate points about all adjacent track points. V may include set virtual nodes s and t, as well as all mapping candidate points of all adjacent track points.

Value of an edge in the directed graph G (V, E) may be as follows. When two nodes of an edge are mapping candidate points, the value of the edge $|e_{t(i,g),t(j,k)}|=\log(P(t(i,g),t(j,k)))$; otherwise, the value of the edge may be 0.

In addition, virtual node s may be connected with the mapping candidate point of the first track point in the track log, and the connected path distance is 0. Virtual node t may be connected with the mapping candidate point of the last track point in the track log, and the connected path distance is 0.

In block 505, calculate the longest distance in the directed graph G (V, E), which is from the virtual node s to virtual node t via the mapping candidate points of all track points, and calculate a trajectory path corresponding to the longest distance.

Calculation about the longest distance is actually the variety of the shortest path algorithm, which may be implemented by referring to the shortest path algorithm of Dijkstra.

Figure 8:
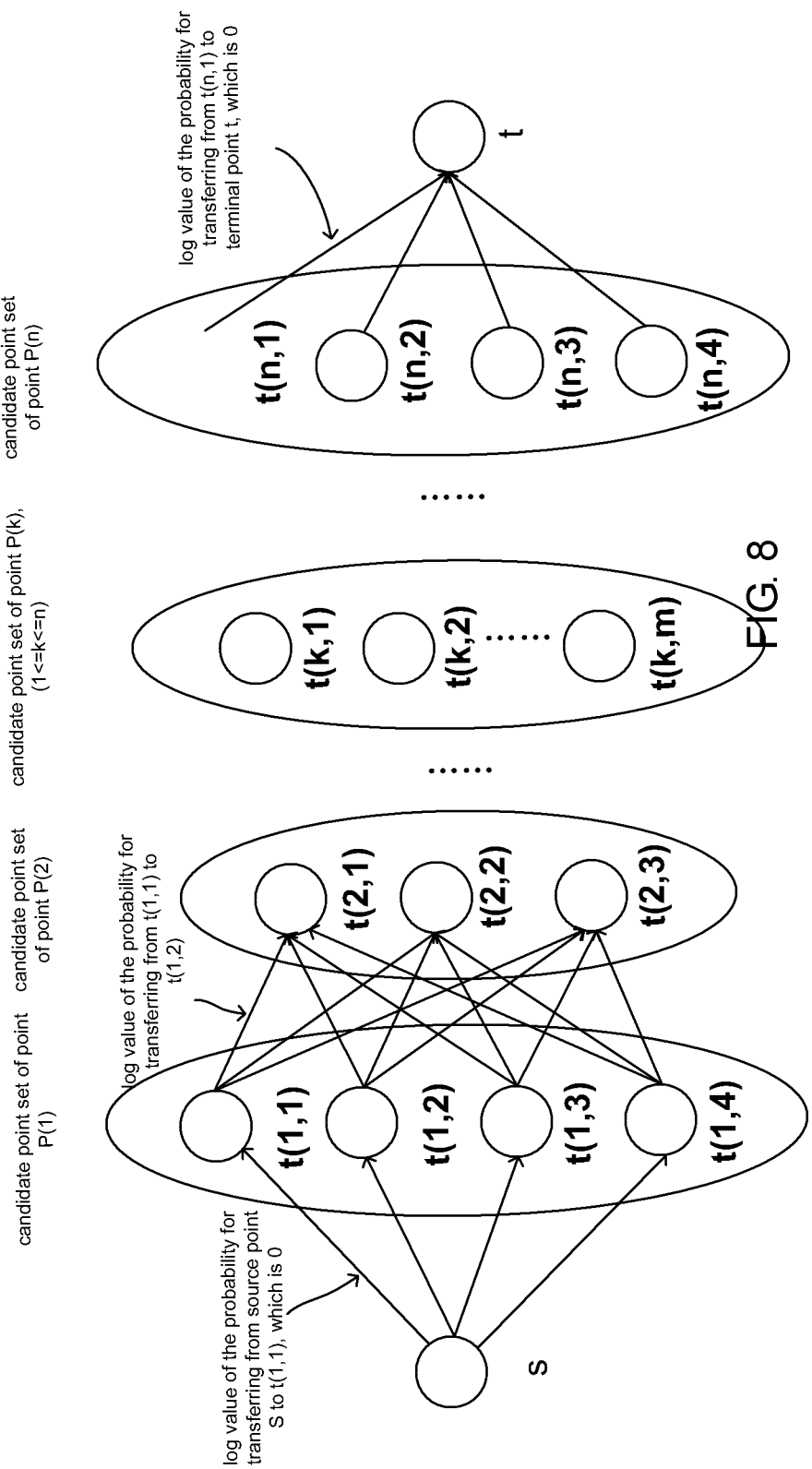
FIG. 8 is a schematic diagram analyzing blocks 504 and 505, in accordance with an example of the present disclosure.

Suppose the total number of track points obtained in block 501 is n, analyze blocks 504 and 505 as follows. After obtaining the transition probability among all mapping candidate points in block 504, the nature of the problem is to calculate the maximum value of product of transition probabilities among all mapping candidate points from track points p(1) to p(n), that is, $MAX(\pi_2^n P(t(i-1,g), t(i,k)), (g \in C_{p(i-1)}, \epsilon C_{p(i)})$. $C_{p(i-1)}$ denotes the total number of mapping candidate points of track point P(i-1). $C_{p(i)}$ denotes the total number of mapping candidate points of track point P(i). Take into account the monotonicity and operation characteristics (log(a*b)=log(a)+log(b)) of log function, the edge value of the directed graph G(V,E) may be considered as the log value of transition probability of any two mapping candidate points. And then, virtual nodes s and t may be added to the directed graph. Subsequently, the problem of calculating the maximum value of product of transition probabilities among all mapping candidate points from track points p(1) to p(n) may be converted into problems, that is, calculate the longest distance between virtual nodes s and t in the directed graph G(V,E) and path problem, which is shown in FIG. 8. In FIG. 8, t(1,1) to t(1,4) is the mapping candidate point set of track point p(1) t(n,1) to t(n,4) is the mapping candidate point set of track point p(n). A distance between any two mapping candidate points in different mapping candidate point sets is the log value of the transition probability between these two mapping candidate points. S and t are two virtual nodes. The distance between virtual node s and any mapping candidate point in the mapping candidate point set of track point p(1) is 0. The distance between any mapping candidate point in the mapping candidate point set of track point p(n) and virtual node t is 0. The problem of searching for the matching point possessing the higher matching degree with the geographical location information of each track point in the track log may be converted into another problem, that is, calculate the longest distance between s and t in FIG. 8.

In block 506, based on the determined trajectory path, search out a matching point possessing a higher matching degree with geographical location information of each track point in the map.

When being implemented, block 506 may be as follows. Regarding each track point, take a mapping candidate point including a track point in the trajectory path as a matching point, which possesses a higher matching degree with the geographical location information of the track point.

Until now, the flow illustrated with FIG. 5 may be completed.

Based on the matching point determined in FIG. 5, descriptions about foregoing block 205 will be provided in the following.

Figure 9:
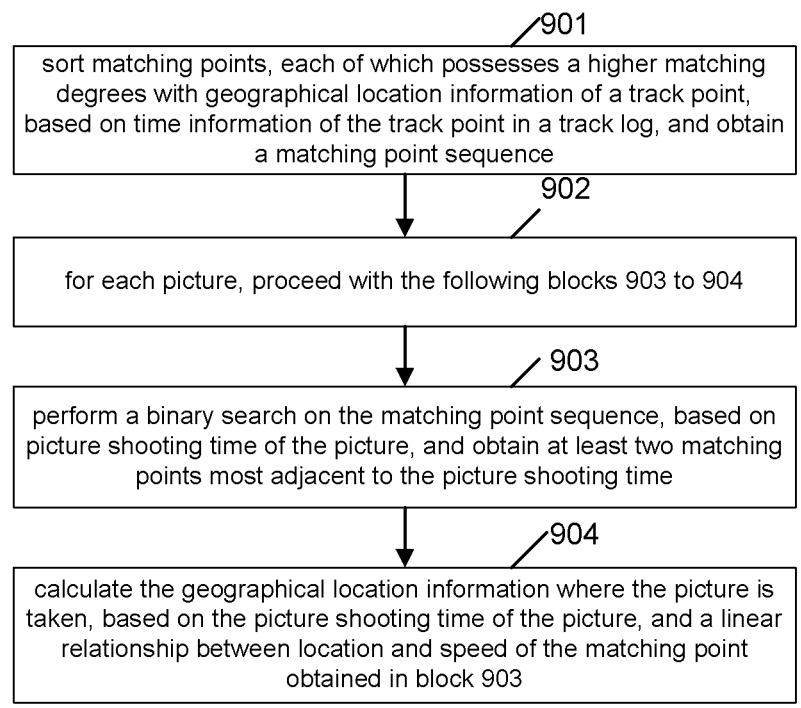
FIG. 9 is a flowchart illustrating how to implement block 205, in accordance with an example of the present disclosure.

With reference to FIG. 9, FIG. 9 is a flowchart illustrating how to implement block 205, in accordance with an example of the present disclosure. As shown in FIG. 9, the flow may include the following blocks.

In block 901, based on time information of track points in a track log, sort matching points, each of which possesses a higher matching degree with geographical location information of the track point, and obtain a matching point sequence.

In block 902, regarding each picture, proceed with the following blocks 903 to 904.

In block 903, perform a binary search on the matching point sequence, based on picture shooting time of the picture, and obtain at least two matching points most adjacent to the picture shooting time of the picture.

When the picture shooting time of the picture is $timestamp_{photo}$, the obtained matching points may be m(i) and m(i+1). Subsequently, timestamp(m(i)) $\leq timestamp_{photo} \leq timestamp$ (m(i+1))).

In block 904, based on the picture shooting time of the picture, as well as a linear relationship between location and speed of the matching point obtained in block 903, calculate the geographical location information where the picture is taken.

Until now, the flow illustrated with FIG. 9 may be completed.

Based on the flow illustrated with FIG. 9, the accurate geographical location information where the picture is taken may be determined. And then, a user may manage the picture, based on the geographical location information where the picture is taken. For example, after returning from tourism by a user at ordinary times, many pictures taken during the tourism may be placed in the same directory, which may be seemed disorganized. Based on the present disclosure, the pictures may be categorized and sorted intelligently, based on the geographical location information and time of the pictures taken, so as to facilitate picture management of the user. Alternatively, a user may have great picture search requirements at ordinary times. However, generally speaking, since picture names may be automatically generated by a camera, searching by the user based on picture name may be not convenient. Based on the present disclosure, when the geographical location information where the picture is taken has been determined, picture searching may be more convenient and practical. For example, only if input "Tiananmen square in Beijing", pictures taken by the user around the Tiananmen square may be displayed, which may be very convenient and practical.

Method provided by the present disclosure has been described in detail by using the foregoing contents. System provided by the present disclosure will be described in the following.

Figure 10:
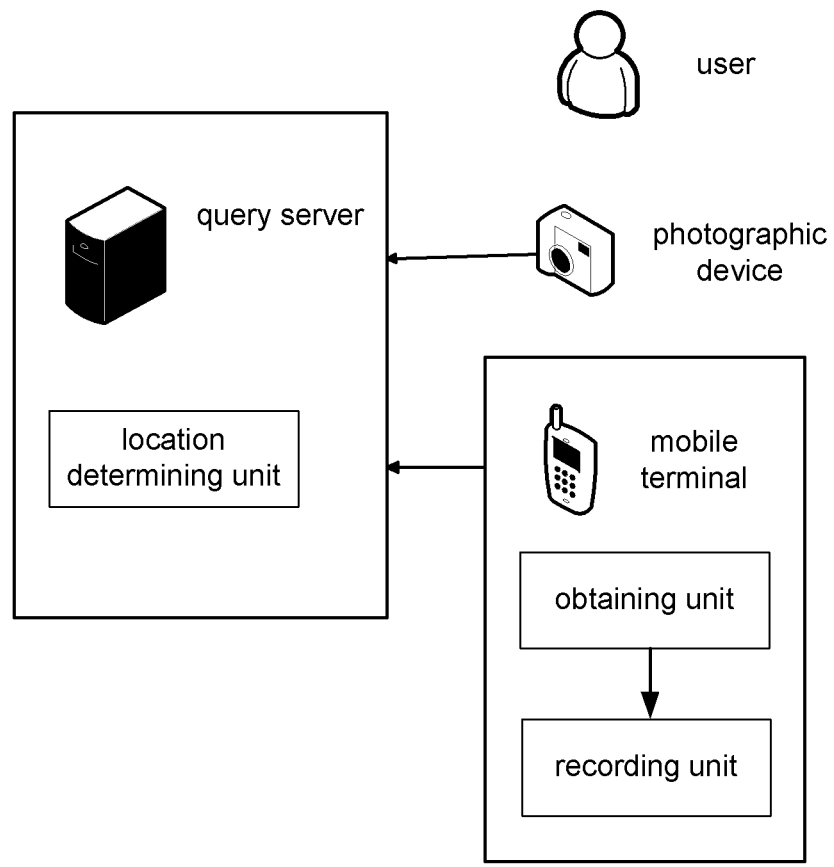
FIG. 10 is a schematic diagram illustrating structure of a system, in accordance with an example of the present disclosure.

With reference to FIG. 10, FIG. 10 is a schematic diagram illustrating structure of a system, in accordance with an example of the present disclosure. As shown in FIG. 10, the system may include a mobile terminal carrying navigation functions and a query server. Time of a photographic device is synchronous with time of the mobile terminal.

The mobile terminal may include an obtaining unit and a recording unit.

The obtaining unit is configured to obtain current time information and geographical location information of current track point, by using navigation functions carried by the mobile terminal, during the process of utilizing the photographic device to take a picture.

The recording unit is configured to record the information obtained by the obtaining unit.

The query server may include a location determining unit, which is configured to associate picture shooting time carried by the taken picture and time information obtained by the mobile terminal, so as to determine the geographical location information where the picture is taken. Associate the picture shooting time carried by the taken picture with the time information obtained by the mobile terminal may be implemented, by utilizing cloud service, which is not limited to the cloud service.

To make the system illustrated with FIG. 10 clearer, each unit in FIG. 10 will be analyzed in detail in the following.

Figure 11:
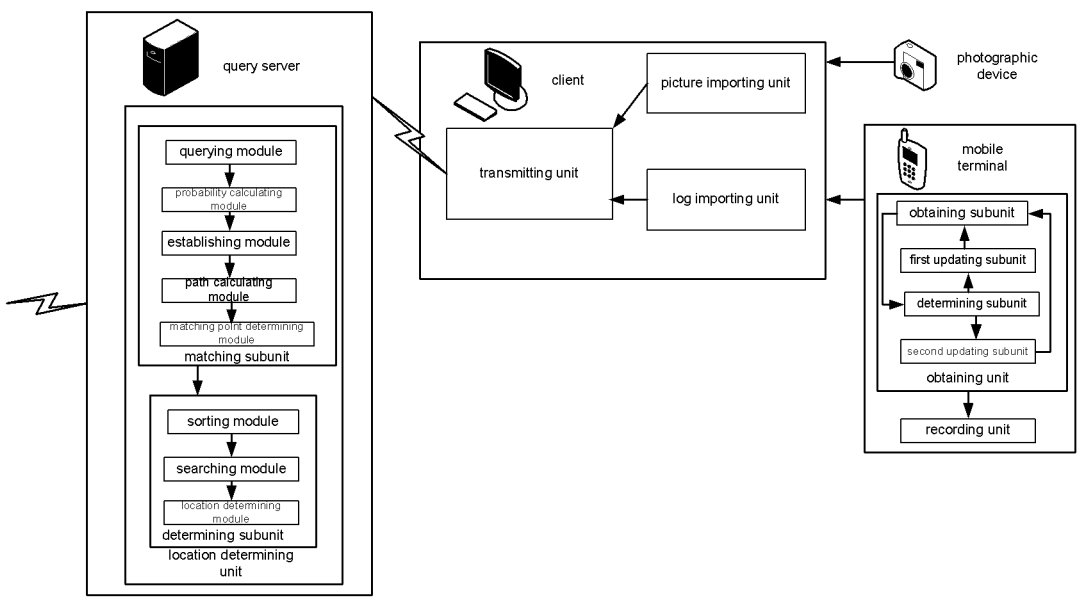
FIG. 11 is a schematic diagram illustrating structure of a system, in accordance with another example of the present disclosure.

FIG. 11 is a schematic diagram illustrating structure of a system, in accordance with another example of the present disclosure. As shown in FIG. 11, when being implemented, the obtaining unit may include an obtaining subunit, a determining subunit, a first updating subunit and a second updating subunit.

The obtaining subunit is configured to execute operations about obtaining current time information and geographical location information of current track point, by using the navigation functions carried by the mobile terminal, after waiting for a time period $\Delta t$.

The determining subunit is configured to determine whether the obtaining subunit has successfully obtained current time information and geographical location information of current track point. When determining that the obtaining subunit has not successfully obtained current time information and geographical location information of current track point, the determining subunit is further configured to inform the second updating subunit. When determining that the obtaining subunit has successfully obtained current time information and geographical location information of current track point, the determining subunit is further configured to trigger the recording unit to record the information successfully obtained by the obtaining subunit, and to return back to the operations executed by the obtaining subunit, when determining that the obtaining is first obtaining, or the obtaining is not first obtaining, however, previous obtaining is successful; otherwise, transmit a notification to the first updating subunit.

After receiving the notification from the determining subunit, the first updating subunit is configured to update $\Delta t$, based on the principle of reducing resource consumption of the mobile terminal, and trigger the obtaining subunit to execute the operations of obtaining current time information and geographical location information of current track point, after waiting for updated $\Delta t$.

After receiving the notification from the determining subunit, the second updating subunit is configured to update number of times about failed statistics, and determine whether updated number of times about failed statistics is less than or equal to a set threshold. When determining that the updated number of times about failed statistics is less than or equal to the set threshold, the second updating subunit is further configured to trigger the obtaining subunit to execute the operations of obtaining current time information and geographical location information of current track point; otherwise, return back to the operations executed by the obtaining subunit.

Preferably, in the example, the recording unit is configured to record current time information and geographical location information of current track point, which are obtained by the obtaining unit, in a track log corresponding to the mobile terminal. Based on this, as shown in FIG. 11, the system may further include a client, which includes a picture importing unit, a log importing unit and a transmitting unit.

The picture importing unit is configured to import picture information of a picture taken by a photographic device to the client. The picture information may at least include an identity (ID) of the picture and picture shooting time of the picture.

The log importing unit is configured to import the track log to the client.

The transmitting unit is configured to transmit the imported picture information and track log to a query server.

Based on the foregoing contents, as shown in FIG. 11, the location determining unit may include a matching subunit and a determining subunit.

The matching subunit is configured to analyze a track point in the received track log, and search out a matching point possessing a higher matching degree with the geographical location information of the track point in the map.

The determining subunit is configured to analyze the matching point searched out by the matching subunit, based on the picture shooting time of the picture, the time information and geographical location information of track point in the track log, and determine the geographical location information where the picture is taken.

The matching subunit may include a querying module, a probability calculating module, an establishing module, a path calculating module and a matching point determining module.

The querying module is configured to obtain all track points from the track log, and regarding each track point, query mapping candidate points of the track point within a set range of R in a map.

The probability calculating module is configured to calculate a transition probability among mapping candidate points of all adjacent track points. The transition probability between two mapping candidate points may denote a possibility of a user actually executing a track transferring from these two mapping candidate points.

The establishing module is configured to establish a directed graph G(V,E), based on the transition probability among mapping candidate points of all adjacent track points. V may include set virtual nodes s and t, as well as all mapping candidate points of all adjacent track points.

The path calculating module is configured to calculate the longest distance in the directed graph G(V,E), which is from virtual node s to virtual node t by passing the mapping candidate points of all track points, and a trajectory path corresponding to the longest distance.

The matching point determining module is configured to search out a matching point, which possesses a higher matching degree with the geographical location information of each track point in the map, based on the determined trajectory path.

Preferably, when being implemented, the determining subunit may include a sorting module, a searching module and a location determining module.

The sorting module is configured to sort matching points searched out by the matching subunit, in which each of the matching points possesses a higher matching degree with geographical location information of track point, based on time information of the track point in the track log, and obtain a matching point sequence.

Regarding each picture, the searching module is configured to perform a binary search on the matching point sequence, based on the picture shooting time of the picture, and obtain at least two matching points most adjacent to the picture shooting time of the picture.

The location determining module is configured to calculate the geographical location information where the picture is taken, based on the picture shooting time of the picture, and a linear relationship between location and speed of the matching point obtained by the searching subunit.

Until now, the descriptions about system structure provided by the present disclosure have been completed.

Based on the foregoing technical solutions, it can be seen that, in the present disclosure, by taking the picture shooting time carried by the picture and the time information recorded by the mobile terminal as a bridge of communication between the photographic device and the mobile terminal, the navigation functions of the mobile terminal device, such as the GPS navigation functions, may be cleverly associated with the picture, which may enable the picture to carry the geographical location information without increasing costs.

Furthermore, in the present disclosure, when having the aid of the navigation functions carried by the mobile terminal, usage of the navigation functions may be minimized, and greater resource consumption may be effectively reduced.

Furthermore, in the present disclosure, determine the geographical location information where the picture is taken by using the track log map matching algorithm, such that accuracy of the determined geographical location information where the picture is taken may be improved.

The invention claimed is:

1. A method for locating a picture based on navigation functions of a mobile terminal, comprising:
during a process of taking the picture by utilizing a photographic device, obtaining and recording, by the mobile terminal, current time information and current geographical location information of a current track point, by using the navigation functions of the mobile terminal;
associating a picture shooting time of the picture taken and the current time information obtained by the mobile terminal, such that geographical location information where the picture is taken is determined, wherein time of the photographic device is synchronous with time of the mobile terminal;
wherein said obtaining and recording by the mobile terminal the current time information and the current geographical location information of the current track point comprises:
after waiting for a time period $\Delta t$, executing operations of obtaining, by the mobile terminal, the current time information and the current geographical location information of the current track point, by using the navigation functions of the mobile terminal;
when the mobile terminal has successfully obtained the current time information and the current geographical location information of the current track point, (a) recording, by the mobile terminal, the obtained current time information and the current geographical location information of the current track point, (b) when the obtaining is a first obtaining, or the obtaining is not the first obtaining, and a previous obtaining was successful, waiting for the time period $\Delta t$, and (c) when the obtaining is not the first obtaining and the previous obtaining was not successful, determining whether the time period $\Delta t$ is less than a set default time period; when the time period $\Delta t$ is less than the set default time period, updating the time period $\Delta t$ to be the default time period, if the time period $\Delta t$ is larger than or equal to the default time period, shortening the time period $\Delta t$ to be a first set value, and after waiting for the updated time period $\Delta t$, obtaining next time information and next geographical location information of a next track point, by using the navigation functions of the mobile terminal;
when the mobile terminal does not successfully obtain the current time information and the current geographical location information of the current track point, (d) updating a number of failures, (e) determining whether the updated number of failures is less than or equal to a set threshold, (f) if the updated number of failures is less than or equal to the set threshold, determining whether the time period $\Delta t$ is greater than or equal to a set maximum time period; when the time period $\Delta t$ is greater than or equal to the set maximum time period, updating the time period $\Delta t$ to be the maximum time period, if the time period $\Delta t$ is less than the maximum time period, expanding the time period $\Delta t$ to be a second set value, and after waiting for the updated time period $\Delta t$, obtaining next time information and next geographical location information of a next track point, by using the navigation functions of the mobile terminal, and (g) if the updated number of failures is greater than the set threshold, waiting for the time period $\Delta t$.

2. The method according to claim 1, wherein recording by the mobile terminal the obtained current time information and the current geographical location information of the current track point comprises:
- recording, by the mobile terminal, the obtained current time information and the current geographical location information of the current track point in a track log corresponding to the mobile terminal;
- wherein associating the picture shooting time of the picture taken and the current time information obtained by the mobile terminal, such that the geographical location information where the picture is taken is determined, comprises:
- respectively importing picture information about the picture taken, and the track log to a client;
- transmitting, by the client, the picture information and the track log to a server, wherein the picture information comprises at least a picture identity (ID) and the picture shooting time of the picture;
- analyzing, by the server, the current track point in the track log, and searching out a matching point possessing a matching degree with the current geographical location information of the current track point in a map;
- analyzing, by the server, the current track point in the track log, based on the picture shooting time of the picture, as well as the current time information and current geographical location information of the current track point in the track log;
- analyzing the matching point, which has been searched out from the map and possesses the matching degree with the current geographical location information of the current track point; and
- determining the geographical location information where the picture is taken.

3. The method according to claim 2, wherein respectively importing the picture information of the picture taken and the track log to the client, and transmitting by the client the picture information and the track log to the server comprise:
- obtaining all track points from the track log;
- for each track point, searching for mapping candidate points of the track point within a set range of R in the map;
- calculating a transition probability among the mapping candidate points of all adjacent track points, wherein the transition probability of two mapping candidate points refers to a possibility for a user actually executing a track transferring from these two mapping candidate points;
- establishing a directed graph G(V,E), based on the transition probability among the mapping candidate points of all adjacent track points, wherein V comprises set virtual nodes s and t, as well as all mapping candidate points of all adjacent track points, the virtual node s is connected with a mapping candidate point of a first track point in the track log, the virtual node t is connected with a mapping candidate point of a last track point in the track log, and a connected path distance is 0;
- calculating a longest distance in the directed graph G(V,E) from the virtual node s to the virtual node t, by passing the mapping candidate points of all track points, and a trajectory path corresponding to the longest distance; and
- searching out a matching point possessing a matching degree with the geographical location information of each track point in the map, based on the trajectory path determined.

4. The method according to claim 3, wherein calculating the transition probability between the mapping candidate point of the current track point and the mapping candidate point of the adjacent track points is implemented by using the following formula:

$$P(t(i, g), t(j, k)) = \frac{dist(p(i), p(j))}{dist_{shortest}(t(i, g), t(j, k))} \text{ if } i \neq j;$$

$$P(t(i, g), t(j, k)) = 0, \text{ if } i = j;$$

$P(t(i,g),t(j,k))=0, \text{ if } i=j;$ wherein p(i) and p(j) denote two adjacent track points, t(i,g) denotes a mapping candidate point of track point p(i), t(j,k) denotes a mapping candidate point of track point p(j), P(t(i,g),t(j,k)) denotes the transition probability between the mapping candidate point t(i,g) of track point p(i) and the mapping candidate point t(j,k) of track point p(j), dist(p(i), p(j)) denotes an Euclidean distance between two adjacent track points p(i) and p(j), and $dist_{shortest}$ (t(i,g),t(j,k)) denotes a shortest distance between t(i,g) and t(j,k) in the map.

5. The method according to claim 2, wherein analyzing by the server the current track point in the track log, based on the picture shooting time of the picture, as well as the current time information and the current geographical location information of the current track point in the track log, analyzing the matching point, which has been searched out from the map and possesses the matching degree with the current geographical location information of the current track point, and determining the geographical location information where the picture is taken, comprises:
- based on the current time information of the current track point in the track log, analyzing, by the server, the current track point in the track log, sorting the matching points, which have been searched out from the map and possess the matching degree with the current geographical location information of the current track point, and obtaining a matching point sequence;
- regarding each picture, performing a binary search on the matching point sequence, based on the picture shooting time of the picture, and obtaining at least two matching points most adjacent to the picture shooting time of the picture; and
- calculating the geographical location information where the picture is taken, based on the picture shooting time of the picture and a linear relationship, which is between a location and a speed of the obtained at least two matching points most adjacent to the picture shooting time of the picture.

6. The method according to claim 2, wherein searching out the matching point possessing the matching degree with the current geographical location information of each track point in the map, based on the trajectory path determined, comprises:
- regarding each track point, taking a mapping candidate point which comprises the track point in the trajectory path as the matching point, which possesses the matching degree with the geographical location information of the track point.

7. A system for locating a picture based on navigation functions of a mobile terminal, wherein the system comprises the mobile terminal with the navigation functions and a query server, time of a photographic device is synchronous with time of the mobile terminal, and the mobile terminal comprises an obtaining unit and a recording unit;

the obtaining unit is configured to obtain current time information and current geographical location information of a current track point, by using the navigation functions of the mobile terminal, during a process of taking the picture with the photographic device;

the recording unit is configured to record the current time information and the current geographical location information obtained by the obtaining unit;

wherein the query server comprises a location determining unit, which is configured to associate a picture shooting time of the picture taken with the current time information obtained by the mobile terminal, and determine geographical location information where the picture is taken;

wherein the obtaining unit comprises an obtaining subunit, a first determining subunit, a first updating subunit and a second updating subunit;

the obtaining subunit is configured to execute operations of obtaining the current time information and the current geographical location information of the current track point, by using the navigation functions of the mobile terminal, after waiting for a time period $\Delta t$;

the first determining subunit is configured to determine whether the obtaining subunit has successfully obtained the current time information and the current geographical location information of the current track point;

when the obtaining subunit has not successfully obtained the current time information and the current geographical location information of the current track point, the first determining subunit is further configured to transmit a notification to the second updating subunit that the obtaining was not successful;

when the obtaining subunit has successfully obtained the current time information and the current geographical location information of the current track point, the first determining subunit is further configured to (a) trigger the recording unit to record the current time information and the current geographical location information successfully obtained by the obtaining subunit, (b) when the obtaining is a first obtaining, or the obtaining is not the first obtaining and a previous obtaining was successful, return to the operations executed by the obtaining subunit, and (c) when the obtaining is not the first obtaining and the previous obtaining was not successful, transmit a notification to the first updating subunit that the obtaining is not the first obtaining and the previous obtaining was not successful;

when receiving the notification that the obtaining is not the first obtaining and the previous obtaining was not successful from the first determining subunit, the first updating subunit is configured to determine whether the time period $\Delta t$ is less than a set default time period; when the time period $\Delta t$ is less than the set default time period, update the time period $\Delta t$ to be the default time period, if the time period $\Delta t$ is larger than or equal to the default time period, shorten the time period $\Delta t$ to be a first set value, and trigger the obtaining subunit to execute operations of obtaining next time information and next geographical location information of a next track point, after waiting for updated time period $\Delta t$; and after receiving the notification from the first determining subunit that the obtaining was not successful, the second updating subunit is configured to (d) update a number of failures, and (e) determine whether the updated number of failures is less than or equal to a set threshold, (f) when the updated number of failures is less than or equal to the set threshold, determine whether the time period $\Delta t$ is greater than or equal to a set maximum time period; when the time period $\Delta t$ is greater than or equal to the set maximum time period, update the time period $\Delta t$ to be the maximum time period, if the time period $\Delta t$ is less than the maximum time period, expand the time period $\Delta t$ to be a second set value, and trigger the obtaining subunit to execute the operations of obtaining next time information and next geographical location information of a next track point, after waiting for the updated time period $\Delta t$, and (g) when the updated number of failures is greater than the set threshold, return to the operations executed by the obtaining subunit.

8. The system according to claim 7, wherein the recording unit is further configured to record the current time information and the current geographical location information of the current track point, which are obtained by the obtaining unit, in a track log corresponding to the mobile terminal, and the system further comprises a client;

wherein the client comprises a picture importing unit, a log importing unit and a transmitting unit;

the picture importing unit is configured to import picture information of the picture taken by the photographic device to the client, and the picture information comprises at least a picture identity (ID) and the picture shooting time of the picture;

the log importing unit is configured to import the track log to the client;

the transmitting unit is configured to transmit the picture information and the track log to the query server;

wherein the location determining unit comprises a matching subunit and a second determining subunit, the matching subunit is configured to analyze the current track point in the received track log, and search out a matching point from a map, which possesses a matching degree with the current geographical location information of the current track point, and the second determining subunit is configured to determine the geographical location information where the picture is taken, based on the picture shooting time of the picture, the current time information and the current geographical location information of the current track point in the track log, as well as analysis about the matching point searched out by the matching subunit.

9. The system according to claim 8, wherein the matching subunit comprises a querying module, a probability calculating module, an establishing module, a path calculating module and a matching point determining module, the querying module is configured to obtain all track points from the track log, and regarding a track point, the querying module is further configured to query mapping candidate points of the track point within a set range of R from the map;

the probability calculating module is configured to calculate a transition probability among mapping candidate points of all adjacent track points, wherein the transition probability of two mapping candidate points refers to a possibility of a user actually executing a track transferring from these two mapping candidate points;

the establishing module is configured to establish a directed graph G(V,E), based on the transition probability among the mapping candidate points of all adjacent track points, wherein V comprises set virtual nodes s and t, as well as all mapping candidate points of all adjacent track points;

the path calculating module is configured to calculate a longest distance in the directed graph G (V,E) from the virtual node s to the virtual node t, by passing the mapping candidate points of all track points, and to calculate a trajectory path corresponding to the longest distance; and the matching point determining module is configured to search out a matching point from the map, which possesses the matching degree with the geographical location information of each track point, based on the trajectory path determined.

10. The system according to claim 8, wherein the second determining subunit comprises a sorting module, a searching module and a location determining module, the sorting module is configured to sort matching points, each of which possesses the matching degree with the current geographical location information of the current track point and is searched out by the matching subunit, based on the current time information of the current track point in the track log, and obtain a matching point sequence;

regarding each picture, the searching module is configured to perform a binary search on the matching point sequence, based on the picture shooting time of the picture, and obtain at least two matching points most adjacent to the picture shooting time of the picture; and the location determining module is configured to calculate the geographical location information where the picture is taken, based on the picture shooting time of the picture, and a linear relationship between location and speed of the matching point obtained by the searching subunit.

* * * * *

UNITED STATES PATENT AND TRADEMARK OFFICE
CERTIFICATE OF CORRECTION

PATENT NO. : 8,976,266 B2
APPLICATION NO. : 14/351117
DATED : March 10, 2015
INVENTOR(S) : Wu Page 1 of 1

It is certified that error appears in the above-identified patent and that said Letters Patent is hereby corrected as shown below:

In the specification

Column 6 line 50, Change "$T_{start} \cdot T_{start}$" to --$T_{start} \cdot T_{start}$--.

Column 9 line 11, Change "$dist_{shartest}$" to --$dist_{shortest}$--.

Column 9 line 22, Change "$dis_{shartest}$" to --$dist_{shortest}$--.

Column 10 line 5, Change "$\varepsilon C_{p(i)})$." to --$k\varepsilon C_{p(i)})$.--.

Column 10 line 7, Change "P(i-1)." to --p(i-1).--.

Column 10 line 8, Change "P(i)." to --p(i).--.

Column 10 line 21, Change "p(1)" to --p(1).--.

In the claims

Column 16 line 7, Claim 4, change "$dist_{shartest}$" to --$dist_{shortest}$--.

Column 16 line 14, Claim 4, before "wherein" delete "P(t(i,g),t(j,k))=0, if i=j;".

Column 16 line 22, Claim 4, change "$dist_{shartest}$" to --$dist_{shortest}$--.

Signed and Sealed this
Fourteenth Day of June, 2016

Michelle K. Lee
*Director of the United States Patent and Trademark Office*